United States Patent

[11] 3,617,029

| [72] | Inventors | Karl Breer<br>Koeln-Flittard;<br>Claus Nadolski, Leverkusen, both of Germany |
|---|---|---|
| [21] | Appl. No. | 799,022 |
| [22] | Filed | Feb. 13, 1969 |
| [45] | Patented | Nov. 2, 1971 |
| [73] | Assignee | Farbenfabriken Bayer Aktiengesellschaft<br>Leverkusen, Germany |
| [32] | Priority | Mar. 23, 1968 |
| [33] | | Germany |
| [31] | | P 17 78 061.9 |

[54] PROCESS AND APPARATUS FOR THE PRODUCTION OF FOAM PLASTICS MATERIALS IN PARTICULAR POLYURETHANE FOAMS
3 Claims, 6 Drawing Figs.

[52] U.S. Cl..................................................... 259/18, 23/252

[51] Int. Cl..................................................... B01f 5/06
[50] Field of Search.......................................... 259/7, 8, 18, 5, 6, 4, 9, 10; 23/252; 137/99

[56] References Cited
UNITED STATES PATENTS

| 2,870,776 | 1/1959 | Marsh | 137/99 |
| 3,067,987 | 12/1962 | Ballou | 259/7 |
| 3,171,721 | 3/1965 | Strathearn | 259/8 |
| 3,265,365 | 8/1966 | Ward | 259/8 |

Primary Examiner—R. Jenkins
Attorney—Burgess, Dinklage & Sprung

ABSTRACT: In the production of foam plastic, changes in the specific volume of the materials mixed together for the reaction which forms the foam, may adversely affect the quality of the product. To compensate for such changes, the feed conduits conveying the materials to the mixing chamber are interconnected by a conduit in which a distensible member sealing the feed conduits from each other, is mounted.

PATENTED NOV 2 1971                                          3,617,029
FIG. 1
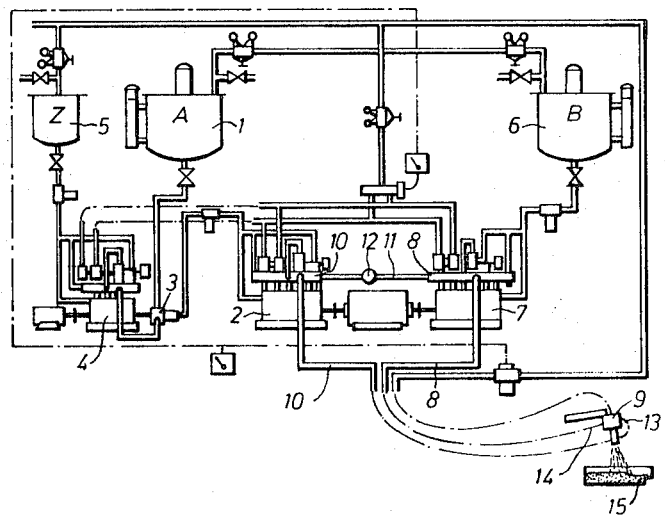
FIG. 2          FIG. 3          FIG. 4
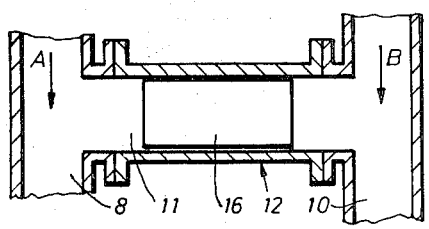    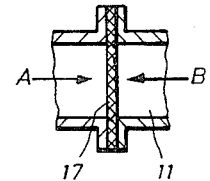    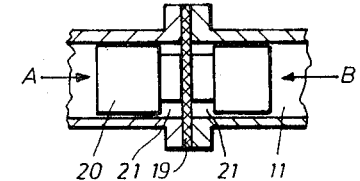
FIG. 5          FIG. 6
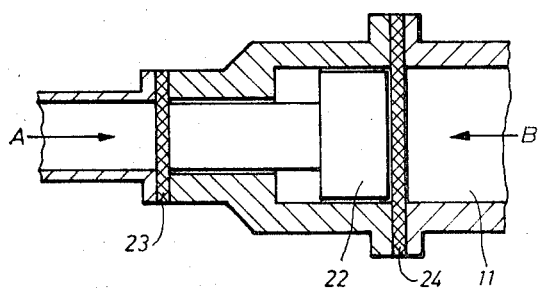    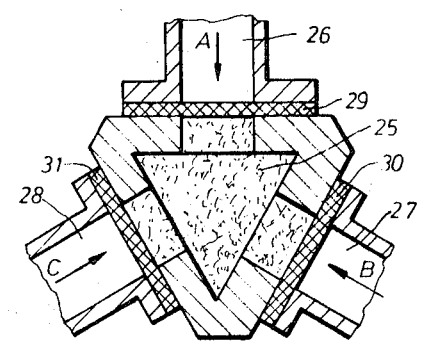
INVENTORS:
KARL BREER, CLAUS NADOLSKI.
BY
*Burgess, Dinklage & Sprung*

PROCESS AND APPARATUS FOR THE PRODUCTION OF FOAM PLASTICS MATERIALS IN PARTICULAR POLYURETHANE FOAMS

The present invention relates to a process and an apparatus for the production of foam plastics, in particular polyurethane foams, from at least two fluid components which quickly react with each other when mixed, which components are forced into a mixing head by means of a pressure pump, the foamable mixture obtained being ejected for example, into a mould, after mixing. The apparatus for this process essentially comprises at least two storage vessels each of which is connected to a pump through pipes, the pressure or outflow ends of the pipes of the pumps being connected to a mixing head.

It is already known that foams may be produced from two or more chemical components which react together to form a foam when they are intimately mixed. One or other of the components may previously have been mixed with such other components as additives which accelerate or retard the foaming reaction dyes or additives which reduce the combustibility of the product. The foam-forming components are each delivered to a common mixing head through a pump system, and mixing takes place in this mixing head. The mixture is then ejected into a mould or sprayed on a moving support where it then foams up.

In order to ensure satisfactory working of the apparatus, and thus to produce a homogeneous foam, it is essential to have constant operating conditions. Over a long operating period however, it is impossible to avoid variations in the nature of the components, especially if they have previously been mixed with other components as disturbances arising out of the mode of operation of the apparatus. If one wishes to produce a particular type of foam, the proportions of the components which are to be delivered are adjusted at the pumps before production begins. It has now been found that cavities occur in the finished foam even if the proportions of reactancy are kept constant. These cavities are particularly undesirable if they occur on the surface of the foam and the foam is to be used without a covering layer. Dashboard frames for motor cars, for example, are produced in this way. The customer cannot be expected to accept surface irregularities and bubbles quickly give the materials an unsightly appearance especially if they are subjected to stress.

It was found that in a substantial number of cases, these cavities or bubbles are caused by a change in the specific volume of one or other component during operation of the process after the initial adjustment of the apparatus for the particular foam which is to be produced has been carried out.

Fluctuations in the specific volume may be caused by refilling the storage vessels or may occur during the pumping operation. For example, isocyanates such as those used in the production of polyurethane foams are capable of taking up air or other gases. A vacuum is produced during the input stroke of the pump, and this vacuum partly draws these gases out of the liquid isocyanate and feeds them into the output end of the stream. This also fluctuations in the specific volume of the components to occur.

When the inlet valves are opened, those components which have undergone a change in specific volume, i.e. a change in compressibility, move at a different rate to those to which the apparatus has been adjusted in accordance with the original specific volume, and the rush ahead or lag behind the other component in spite of the fact that both valves are opened at the same time. A small amount of one or more components thus enter the mould without having been mixed, and form the above-mentioned bubbles and cavities because this unmixed portion is not foamable.

This phenomenon may be explained in the following manner When the apparatus is initially adjusted and is at a certain operating pressure, the components are accurately adjusted with respect to each other. If a change in the specific volume, i.e. in the compressibility, then occurs during the operation of the process, this may be compared to a positive or negative pretension of the components which, although not altering the operating pressure, manifests itself as the above-mentioned rushing ahead or lagging behind when there is a sudden release of pressure on opening of the inlet valves.

It has now been found that this rushing ahead or lagging behind of one component with respect to any other on opening of the inlet valves of the mixing head can be avoided by compensating for the fluctuations in the specific volume of the components which are delivered by providing a communicating connection between the outflow ends of the pipe systems of the pumps before mixing. The fluctuations in compressibility are equalized through the communicating connection for the reason that this fluctuation affects the components through the communicating connection and this produces a counter reaction which compensates for the fluctuation. If the components are delivered at different operating pressures or if they have different compressibility properties, these differences must be taken into account when constructing the communicating connection. If these operating conditions are observed, the difference in speed of one component on opening the inlet valves at the mixing head, due to fluctuations in compressibility is avoided because the speed with which the pressure is released is the same for both components.

This compensation for the fluctuations in compressibility generally only has to be carried out between the two end components because all other additives are previously mixed with one or other of these two components in known manner, provided this does not bring about an unwanted preliminary reaction. Clearly, the process according to the invention can also be used for the preliminary mixing with the additives, if necessary. The compensation for the fluctuations in compressibility can also be carried out in an analogous manner, according to the invention, for more than two end components. Owing to the increasing number of factors which then have to be taken into account, however, the conditions which have to be observed in carrying out the process are accordingly more complicated.

A large number of different kinds of apparatuses are known for carrying out the above-mentioned process, but they all essentially consist of two storage vessels each of which is connected to its pump through pipes, the outflow pipes of each pump being connected to a mixing head. Appropriate additional vessels, pipes and connections are provided for the premixing with other components, if necessary.

The novel feature of the present invention is the feature whereby the output pipe systems are connected to each other through a sealing, movable compensating means. The fluctuations in compressibility of any one component are transferred, in terms of change in specific volume, to the other component and equalized between the two or more components by means of such a compensating means.

The particular manner of implementing this modification to the apparatus is not critical and since many forms of the compensating member are within the scope of the invention only a few characteristic examples will therefore be indicated. In principle, the compensating means may operated by mechanical, hydraulic, pneumatic or electrical means or by a combination of these. The electrical construction will not be discussed here as it would appear complicated compared with the others.

In one advantageous embodiment of the invention, the compensating means is mechanical in operation, consisting of a piston arranged in a connecting duct. The piston is fitted very accurately into the connecting duct in order to prevent admixture of the components occurring due to leakage because the reaction which immediately sets in would impair the mobility of the piston and prevent the desired effects being achieved.

According to another embodiment, the compensating means consists of a distensible membrane which is placed across the connecting duct and thus completely and securely seals off the outflow pipe systems from each other. The membrane should be as elastic and as thin as possible so as not to dampen or falsify the fluctuations in compressibility which occur in the transmission. Compared with the above-described embodiment in which a piston is used it has the advantage of not being liable to leak when in use. However, there is a risk of its being liable to break after being in operation for some time and consequently leaking.

In third embodiment therefore a combination of the two above described types of compensating means is used, in which the piston may either be firmly connected to the connecting duct through a distensible membrane but still be displaceable or at least one of the two surfaces acted upon by the piston has a membrane placed in front of it adjacent to the surface.

According to another embodiment, which may advantageously be used in particular when more than two components are to be mixed, the compensating means consists of a pressure chamber which is filled with a fluid substrate, i.e. a gas or a liquid, and is sealed off against the connections of pipe systems by means of distensible membranes.

In order to prevent leakages occurring in this case, the individual connections may be designed according to the third embodiment which has been described above, using in each case one piston with one or two membranes, one end of the piston facing the pipe system of the particular component and the other facing the common pressure chamber.

Provided that all the components are under the same operating pressure and have approximately the same compressibility, the surface of the compensating means on which the components act should be made equal in size. If the operating pressures or compressibilities are different, the areas of the surfaces should be made in the correct ratio to each other in accordance with the known physical laws in order to obtain the desired effect.

The mode of operation of the process according to the invention will now be explained with reference to the accompanying drawings which illustrates diagrammatically a foaming apparatus and embodiments of the compensating means according to the invention.

FIG. 1 shows diagrammatically a foaming apparatus and

FIGS. 2 to 6 show different embodiments of the compensating member in section.

In FIG. 1 a storage vessel 1 which contains a component A is connected to the input end of pump 2. An activator additive Z delivered from a storage vessel 5 means of a pump 4 is added to the component A at a connection 3. A component B is stored in a storage vessel 6 and is fed into the input chamber by a pump 7. The pipe system 8 on the outflow side of the pumps, which consists of a pressure chamber and rigid and flexible pipe connections, leads to a mixing head 9, as does the similarity constructed output pipe system 10 of the pump 2. The pressure chamber of the output pipe system 8 and 10 communicate with each other through a connecting duct 11 and a compensating means 12. The mixing head 9 consists in known manner of a mixing chamber with or without stirrer, inlet nozzles and inlet valves 13 and 14 for components A and B. Initially, components A and B are so adjusted with respect to each other by means of adjustment screws 15 and 16 that when the inlet valves 13 and 14 are opened, they mix evenly, i.e. without one or other component rushing ahead of the other, and they are then introduced into a mould 15 as a foamable reaction mixture. If a change, e.g. in compressibility now takes place, i.e. change in the specific volume of component A, then component B will be acted upon in the appropriate manner by compensating means 12 so that the fluctuations in compressibility are evened out to such an extent that neither of the components will rush ahead or lag behind when the inlet valves are opened or the components leave the nozzles.

In FIG. 2, the compensating means 12 consists of the connecting duct 11 which is attached to the pipe systems 8 and 10 and into which a piston 16 is fitted to produce a seal.

FIG. 3 shows a connecting duct 11 which has a stretchable membrane.

FIG. 4 shows the combination of the embodiments shown in FIGS. 2 and 3 to avoid all loss by leakage. A membrane 19 is stretched across the connecting duct 11. It has a central aperture through which a screw connection (not shown) extends to connect the two halves of a piston 20. The adjacent piston surfaces are sealed by firmly tightening the screw connection. Cavities 21 are formed to enable the membranes 19 to expand when the piston 20 is displaced.

FIG. 5 shows an alternative embodiment to that shown in FIG. 4. Since fluctuations in the components A and B are to be compensated for in a given ratio, the connecting duct 11 has a larger diameter at the end connecting it to the pipe system for component B than at the end connecting it to the pipe system for component A. A piston 22 accordingly has different diameters at its two ends. Membranes 23 and 24 ensure complete absences of leaks. Instead of the piston 22, one may, of course, also use a gas or liquid which should preferably be incompressible, to fill the space between the two membranes 23 and 24.

FIG. 6 shows a variation of the last-described embodiment for a three-component system. The compensating member 12 essentially comprises a pressure chamber 25 which is filled with a liquid or a gas and which is sealed off against connecting pipes 26, 27 and 28 for components A, B and C by membranes 29, 30 and 31. If, for example, there is a change in the compressibility of component A, this is equalized against components B and C through the medium in the pressure chamber 25.

We claim:

1. In apparatus for mixing of materials which after being mixed react to form foam, comprising:
    a. two storage vessels,
    b. a pump for each storage vessel, each pump having its inlet communicating by an inlet conduit with its storage vessel,
    c. a mixing head communicated with each of the pumps by pump discharge conduits, for receiving the discharged material of each pump and mixing the two discharged materials for said reaction thereof to form foamed material,
the improvement which comprises:
    d. a connecting conduit interconnecting the discharge conduits, a distensible membrane mounted in the connecting conduit sealing the discharge conduits from each other and movable in the connecting conduit in response to a change in specific volume of materials in the discharge conduits to compensate therefor, and prevent change in specific volume from interferring with the mixing in the mixing head.

2. Apparatus according to claim 1, and a piston slidably mounted in the connecting conduit abutting with the distensible membrane.

3. Apparatus according to claim 1, and a second distensible membrane as aforesaid, said membranes being in axially spaced relation in the conduit, and a fluid filling the conduit between said membranes.

PO-1050
(5/69)

UNITED STATES PATENT OFFICE
CERTIFICATE OF CORRECTION

Patent No. 3,617,029          Dated    Nov. 2, 1971

Inventor(s)  Karl Breer, et al.

It is certified that error appears in the above-identified patent and that said Letters Patent are hereby corrected as shown below:

Col. 4, line 62, after "fluid" insert --body--.

Signed and sealed this 11th day of April 1972.

(SEAL)
Attest:

EDWARD M. FLETCHER, JR.
Attesting Officer

ROBERT GOTTSCHALK
Commissioner of Patents